United States Patent
Elsayed et al.

(10) Patent No.: US 10,412,669 B2
(45) Date of Patent: Sep. 10, 2019

(54) LOW POWER CELLULAR MODEM SYSTEM ARCHITECTURE

(71) Applicant: Apple Inc., Cupertino, CA (US)

(72) Inventors: Moustafa M. Elsayed, Los Gatos, CA (US); Tarik Tabet, Los Gatos, CA (US); Awais M. Hussain, Milpitas, CA (US); Lydi Smaini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 15/273,462

(22) Filed: Sep. 22, 2016

(65) Prior Publication Data

US 2017/0265132 A1    Sep. 14, 2017

Related U.S. Application Data

(60) Provisional application No. 62/307,693, filed on Mar. 14, 2016.

(51) Int. Cl.
  *H04W 52/02*    (2009.01)
  *H04W 88/02*    (2009.01)
  *H04W 88/08*    (2009.01)
  *H04L 5/00*     (2006.01)

(52) U.S. Cl.
  CPC ..... *H04W 52/0209* (2013.01); *H04W 52/028* (2013.01); *H04W 52/0216* (2013.01); *H04L 5/00* (2013.01); *H04W 88/02* (2013.01); *H04W 88/08* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01);
(Continued)

(58) Field of Classification Search
  None
  See application file for complete search history.

(56) References Cited

U.S. PATENT DOCUMENTS

| 5,594,782 | A | 1/1997 | Zicker |
| 7,305,259 | B1* | 12/2007 | Malone ............... H04W 52/028 455/574 |
| 9,504,059 | B2 | 11/2016 | Belghoul et al. |

(Continued)

FOREIGN PATENT DOCUMENTS

EP    2 903 354 A1    8/2015

OTHER PUBLICATIONS

Kini, Ananth V., et al.; "A Dynamic Subframe Set Power Control Scheme for Interference Mitigation in Reconfigurable TD-LTE Systems"; 23rd Wireless and Optical Communication Conference (WOCC); May 9-10, 2014; 6 pages.

(Continued)

*Primary Examiner* — Alpus Hsu
*Assistant Examiner* — Camquyen Thai
(74) *Attorney, Agent, or Firm* — Meyertons Hood Kivlin Kowert and Goetzel PC; Jeffrey C. Hood

(57) ABSTRACT

In some embodiments, a cellular modem that has reduced power requirements. The cellular modem architecture is divided into three orthogonal domains or modules, these being a control module, an uplink module, and a downlink module. Each of the uplink module and the downlink module is configured to be separately powered down without affecting operation of the other modules.

16 Claims, 10 Drawing Sheets

(52) U.S. Cl.
CPC .............. *Y02D 70/23* (2018.01); *Y02D 70/24* (2018.01); *Y02D 70/26* (2018.01)

(56) References Cited

U.S. PATENT DOCUMENTS

| | | |
|---|---|---|
| 2005/0105369 A1 | 5/2005 | Schoenfeld |
| 2005/0118981 A1 | 6/2005 | Laroia et al. |
| 2006/0187862 A1 | 8/2006 | Lee et al. |
| 2008/0310485 A1* | 12/2008 | Soliman ............... H04B 1/7115 375/147 |
| 2009/0253448 A1* | 10/2009 | Kwon ................... H04W 24/02 455/501 |
| 2009/0290561 A1 | 11/2009 | Kleindl |
| 2010/0136928 A1 | 6/2010 | Rofougaran |
| 2011/0003609 A1 | 1/2011 | Sundstrom et al. |
| 2011/0280133 A1 | 11/2011 | Chang et al. |
| 2013/0040666 A1 | 2/2013 | Chin et al. |
| 2013/0157590 A1* | 6/2013 | Mo ................... H04W 52/0209 455/77 |
| 2013/0242818 A1* | 9/2013 | Heo ................. H04W 72/0413 370/280 |
| 2014/0153460 A1* | 6/2014 | Shrivastava ...... H04W 52/0225 370/311 |
| 2014/0313908 A1* | 10/2014 | da Silva .................. H04W 4/70 370/252 |
| 2014/0362728 A1 | 12/2014 | Krochmal et al. |
| 2014/0364118 A1 | 12/2014 | Belghoul et al. |
| 2015/0011157 A1 | 1/2015 | Terry |
| 2015/0092645 A1 | 4/2015 | Tabet et al. |
| 2015/0271769 A1* | 9/2015 | Bharadwaj .......... H04W 52/325 455/522 |
| 2015/0282045 A1* | 10/2015 | Salem ................... H04W 40/10 370/329 |
| 2015/0351032 A1 | 12/2015 | Homchaudhuri |
| 2016/0197736 A1* | 7/2016 | Shvarzberg ......... H04L 12/6418 713/310 |
| 2016/0234718 A1 | 8/2016 | Thangarasa et al. |
| 2016/0270118 A1* | 9/2016 | He ........................ H04W 74/06 |
| 2016/0294942 A1* | 10/2016 | Tembey .............. H04L 67/1095 |
| 2016/0295637 A1 | 10/2016 | Bergquist et al. |
| 2017/0013630 A1 | 1/2017 | Franz et al. |

OTHER PUBLICATIONS

International Search Report and Written Opinion, Application No. PCT/US2017/013668, dated Apr. 6, 2017, 13 pages.

\* cited by examiner

LOW POWER CELLULAR MODEM SYSTEM ARCHITECTURE

PRIORITY CLAIM

This application claims benefit of priority of U.S. provisional application Ser. No. 62/307,693, titled "Low Power Cellular Modem System Architecture", filed Mar. 14, 2016, whose inventors are Moustafa M. Elsayed, Tarik Tabet, Awais M. Hussain, and Lydi Smaini and which is hereby incorporated by reference in its entirety as though fully and completely set forth herein.

TECHNICAL FIELD

The present application relates to wireless communication, including an improved cellular modem system architecture with reduced power consumption.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices, including both wearable devices and more traditional wireless devices such as smart phones. Therefore, improvements in the field are desired.

SUMMARY

Embodiments are presented herein of, inter alia, a wireless device, such as a smart watch or phone, with an improved cellular modem system architecture for more efficient communication operations and reduced power requirements. The cellular modem architecture is divided into three orthogonal domains or modules, these being a control module, an uplink module, and a downlink module.

The uplink module may comprise an uplink manager processor and an associated uplink hardware subsystem coupled to the uplink manager processor. The downlink module may comprise a downlink manager processor and an associated downlink hardware subsystem coupled to the downlink manager processor. In some embodiments, the uplink module comprises a first plurality of hardware resources and the downlink module comprises a second plurality of hardware resources, and these first and second pluralities of hardware resources may be separate such that no hardware resources are shared between the uplink module and the downlink module.

Each of the uplink module and the downlink module is configured to be separately powered down without affecting operation of the other modules. The control module may be configured to selectively power on and/or power off each of the uplink module and the downlink module based on whether uplink or downlink communications are required. For example, the control manager module may selectively power off the uplink module when uplink communications are not needed, and may selectively power off the downlink module when downlink communications are not needed. In addition, each of the uplink module and the downlink module may be configured to selectively power down a subset of its respective hardware components to reduce power requirements.

The control module, the uplink module and the downlink module may each comprise a processor (or "core") that executes software. In some embodiments the software is architected in a non-hierarchical fashion such that the software does not include different hierarchical layers, but rather has a "flat" structure. This reduces overhead and inefficiencies in terms of passing messages between different software layers.

The control module may perform receiving/processing of the downlink control channel(s). The downlink control channel (the PDCCH) comprises information from the network side that may indicate the downlink and/or uplink operations that the UE should perform. The control module monitors the downlink control channel(s) and then initiates operation of either the downlink module or the uplink module as appropriate. For example, the downlink control channel may indicate that a downlink data channel is scheduled to contain data targeted for the UE, in which case the control module may direct the downlink module to power on and monitor the downlink data channel for the received data. Alternatively, the downlink control channel (the PDCCH) may contain uplink grants indicating that the UE is being granted permission to perform uplink communications. In this instance, the control module may direct the uplink module to power on at the appropriate time to perform the uplink communications.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 10 and 11 illustrate utilization of control, downlink and uplink resources for a page monitoring use case, according to some embodiments, wherein FIG. 10 illustrates operation according to the prior art system architecture of FIG. 4 and FIG. 11 illustrates operation according to the system architecture of FIG. 8.

Figure 1:
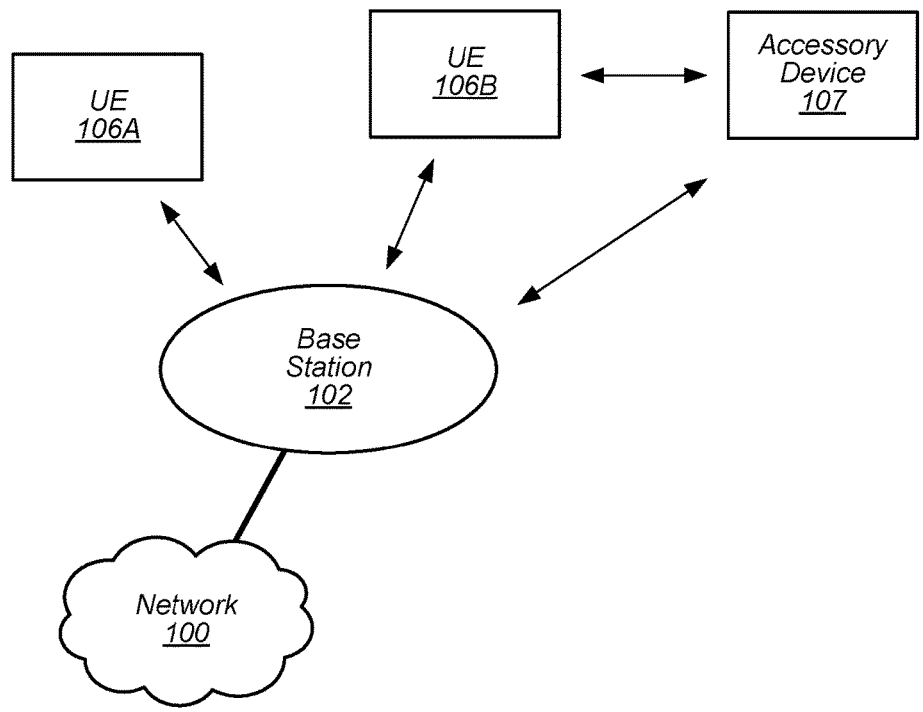
FIG. 1 illustrates an example wireless communication system including one or more smart phones and an accessory device.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Glossary

The following acronyms are used in this disclosure:
PUCCH: Physical Uplink Control Channel
PUSCH: Physical Uplink Shared Channel
PRACH: Physical Random Access Channel
PDCCH: Physical Downlink Control Channel
PDSCH: Physical Downlink Shared Channel
EPDCCH: Enhanced Physical Downlink Control Channel
PCFICH: Physical Control Format Indicator Channel
PHICH: Physical Hybrid-ARQ Indicator Channel
PBCH: Physical Broadcast Channel
PSS: Primary Synchronization Signals
SSS: Secondary Synchronization Signals
UL: Uplink
DL: Downlink
ULM: Uplink Manager
DLM: Downlink Manager
HARQ: Hybrid Automatic Repeat Request
HW: Hardware
TTI: Transmit Time Interval Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer system devices which performs communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device, or any type of communication device. The wireless device embodiment described below is one example embodiment.

As shown, the example wireless communication system includes a cellular base station 102A, which communicates over a transmission medium with one or more wireless devices 106A, 106B, etc., as well as accessory wireless device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 may include cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., dues to conditions such as current battery status, inability to access a network, or poor reception.

Figure 2:
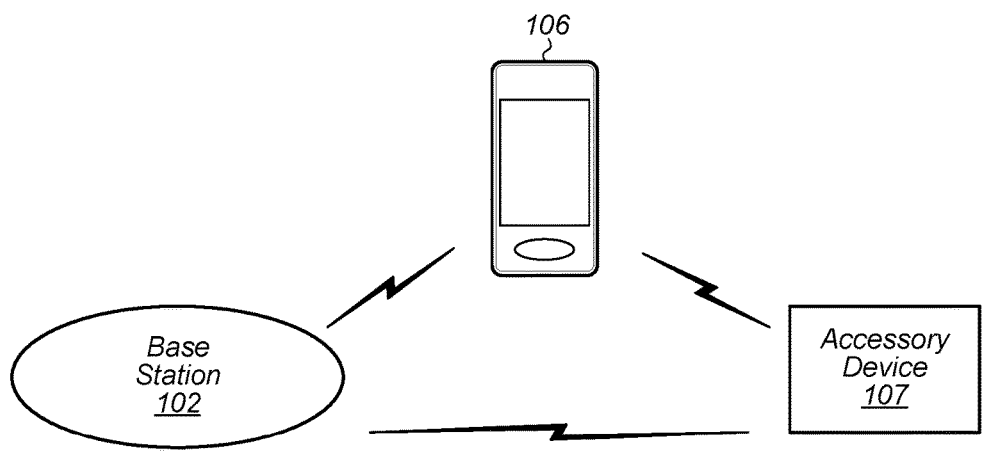
FIG. 2 illustrates an example system where various UEs, such as a smart phone, accessory device, etc., can communicate with a cellular base station.

FIG. 2 illustrates a UE device 106 (e.g., a smart phone) and a UE accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol, and may then use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. For example, the UE 106 might include a shared radio for communicating using either of LTE (or LTE-Advanced) or Bluetooth, and separate radios for communicating using each of LTE-Advanced and Bluetooth. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with WiFi capabilities (and possibly limited or no cellular communication capabilities) which is not currently near a WiFi hotspot and hence is not currently able to communicate over WiFi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

The UE 106 and/or 107 may include a device or integrated circuit for facilitating cellular communication, referred to as a "cellular modem". The cellular modem may include one or more processors (processor elements) and various hardware components as described herein. The cellular modem is described further below. A UE 106 and/or 107 which includes the cellular modem may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The cellular modem described herein may be particularly advantageous for use in an accessory UE device, such as a smart watch or other wearable device, that is link budget limited. For example, the cellular modem may be particularly beneficial to devices that are power constrained and which can or typically do operate at low data rates.

Figure 3:
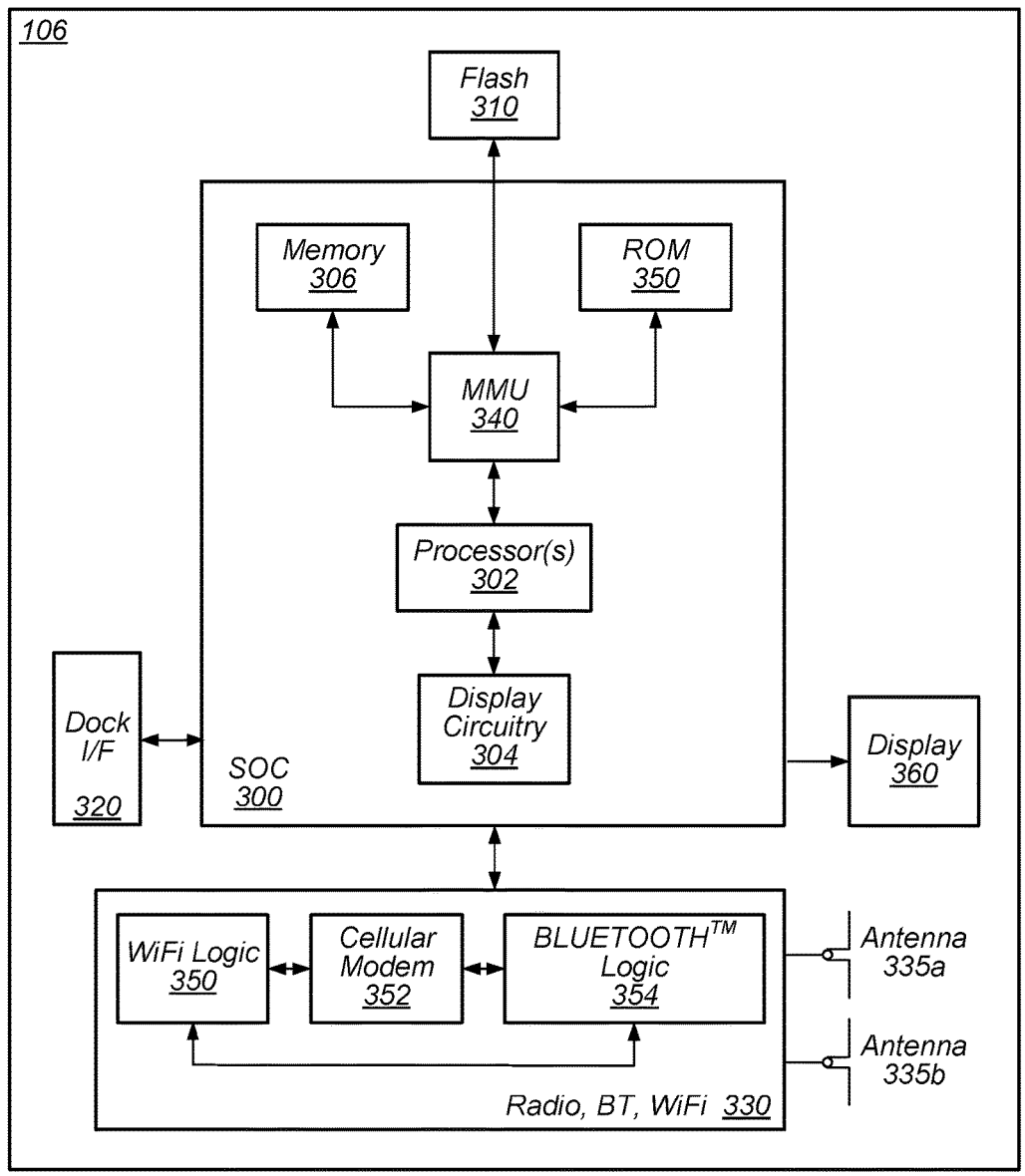
FIG. 3 is a block diagram of an example wireless device.

FIG. 3—Example Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the accessory device 107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The UE device 106/107 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the accessory device 107. For example, the UE device 106/107 may include various types of memory, a connector interface 320 (e.g., for coupling to a computer system), the display 360, and wireless communication circuitry 330 (e.g., for communication using cellular, Wi-Fi, Bluetooth, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE may in some embodiments be configured to communicate wirelessly using a plurality of wireless communication standards or radio access technologies (RATs).

The wireless communication circuitry 330 may include Wi-Fi Logic 350, a Cellular Modem 35, and Bluetooth Logic 354. The Wi-Fi Logic 350 is for enabling the UE device 106/107 to perform Wi-Fi communications on an 802.11 network. The Bluetooth Logic 354 is for enabling the UE device 106/107 to perform Bluetooth communications. The cellular modem 352 may be a lower power cellular modem having a system architecture as described herein, and as shown by at least FIGS. 6-8.

As described herein, the cellular modem 352 may include hardware and software components for implementing embodiments of this disclosure. The cellular modem 352 of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
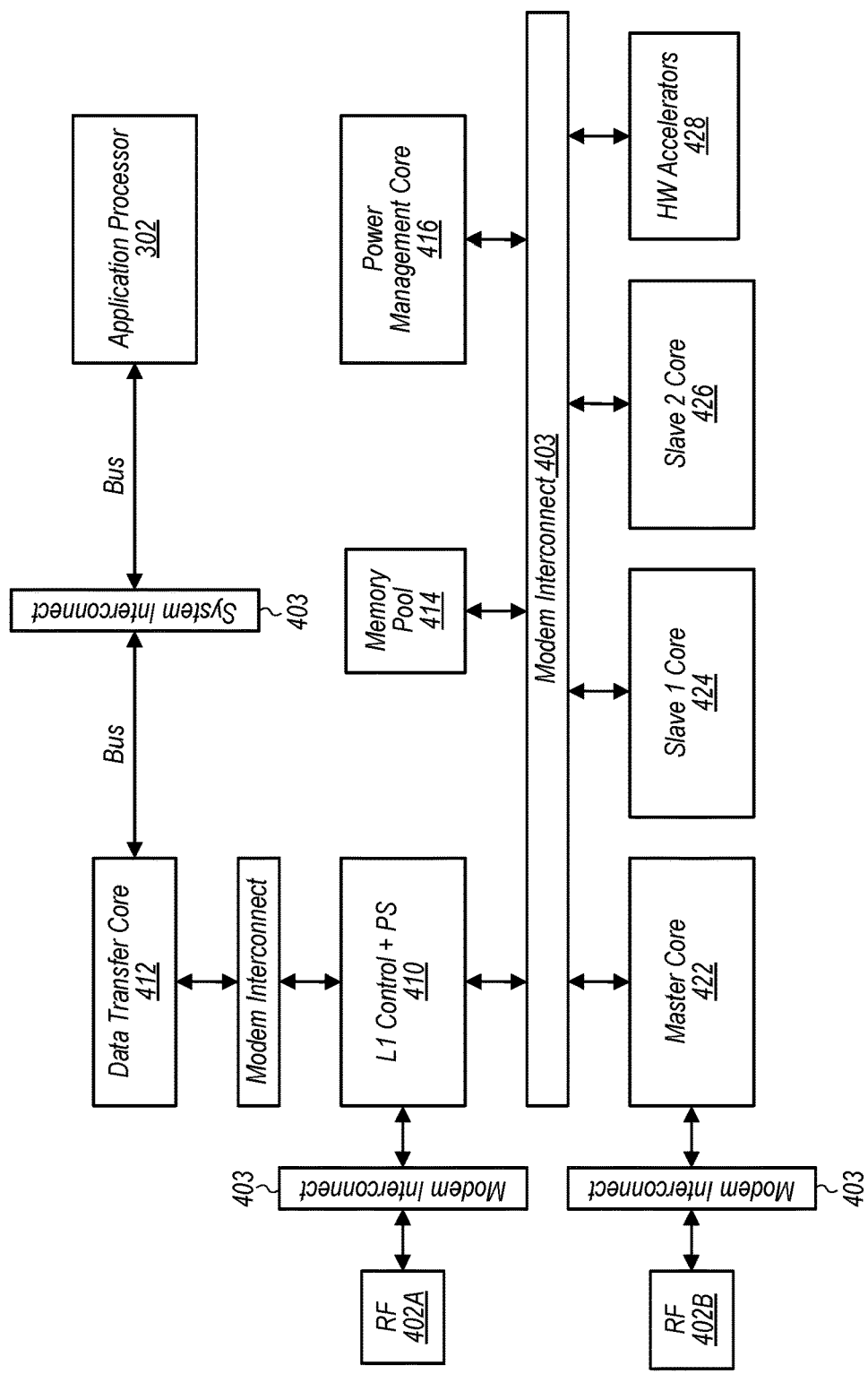
FIG. 4 illustrates a system architecture according to the prior art.

FIG. 4—Prior Art Cellular Modem Architecture

FIG. 4 illustrates an architecture of a cellular modem in the prior art. As shown, this example prior art architecture includes first and second RF (radio frequency) circuitry 402A and 402B. The first RF circuitry 402A couples to an L1 Control Core 410, where L1 refers to the Physical Layer. The L1 Control Core 410 performs lower Layer 1 control, i.e., executes "upper layer" software that controls the lower layer driver software that interfaces to the hardware. The L1 Control Core 410 may include protocol stack (PS) software or may couple to a PS (Protocol Stack) Core. The L1 Control Core 410 (or Protocol Stack Core) may couple through a bus to the Application Processor 302. The second RF circuitry 402B couples to a Master Core 422. The Master Core 422 also performs lower Layer 1 control and may be implemented in firmware. The architecture may also include a Slave 1 Core 424, which performs lower Layer 1 control, and a Slave 2 Core 426, which performs upper Layer 1 control. The architecture may further include one or more memory pools 414, hardware accelerators and/or a power management core 416.

The L1 Control Core 410 performs various tasks, such as: dispatching higher layer messages to the corresponding modules/threads; managing/configuring all physical channels including uplink/downlink channels and control/data channels; scheduling measurements and RF activities; performing conflict resolution; and power saving. The L1 Control Core 410 has two states, these being "On" and "LowPowerState", and its duty cycle is such that it is in an "On" state 95% of the time. The L1 Control Core 410 is in the "LowPowerState" in DRX mode.

The Master Core 422 performs various tasks, such as: dispatching L1 Control layer messages to the corresponding modules/threads; managing/configuring the hardware components of the physical channels including uplink/downlink channels and control/data channels; scheduling measurements and RF activities; scheduling/assigning tasks lists to all each of the three Cores; reporting results to the L1 Control Core 410; resolving conflicts when using shared resources; and managing power gating/DVFS for all Lower Layer 1 Control and HW-modules. The Master Core 422 has two states, these being "On" and "LowPowerState", and its duty cycle is generally in an "On" state 95% of the time. The Master Core 422 is in the "LowPowerState" in DRX mode.

The Slave 1 and Slave 2 Cores 424 and 426 perform various tasks, such as configuring/controlling hardware components according to the dispatched task list and delivering results to the Master Core 422. For each of the Slave Cores 424 and 426, the task list is the only input and the results of the individual tasks are the only output. The Slave Cores 424 and 426 also have the ability to access hardware components present in the system. The Slave 1 and 2 Cores 424 and 426 each have two states, these being "On" and "LowPowerState", and they are in the "On" state during task list execution. The Slave Cores 424 and 426 are in the "LowPowerState" when inactive.

The Memory Pool(s) 414 are shared among the cores and may contain various buffers, such as a MAC-DL-FIFO, a -MAC-UL-FIFO, an Interprocessor Shared Memory, and Housekeeping memory for scheduling, conflict handling, threads data, etc.

The L1 Control Core 410 and Master Core 424 are configured for bidirectional communication all of the time. Neither of these two cores with all their associated system resources can be switched off at any time. These two cores spend a great deal of their time dealing with scheduling, conflict handling, resource management and housekeeping for their threads/tasks interactions. This leads to latency in executing power saving modes and causes the system to be less responsive to LTE-air-interface activities (requests must propagate through three layers of software down to the hardware which serves the air interface).

For any cellular (e.g., LTE) activity, the two Slave Cores 424 and 426 are used to dispatch tasks to the hardware. These two cores cannot decide whether or not they should be in an off state. As a result, they spend the most of their life cycles in a "waiting for action" state, executing wait cycles. The memory pools 414 (for hardware Processors) are also in an "on" ("non-off") state all of the time. The hardware path is also active during any kind of LTE activity in the air interface.

The prior art cellular modem architecture contains a real time operating system (RTOS) running in the primary core that manages software operations, assigns and distributes threads, etc. These prior art architectures also include a scheduler (referred to as L1 control) executing within the L1 Control Core 410 for scheduling operations within the single core.

Figure 5:
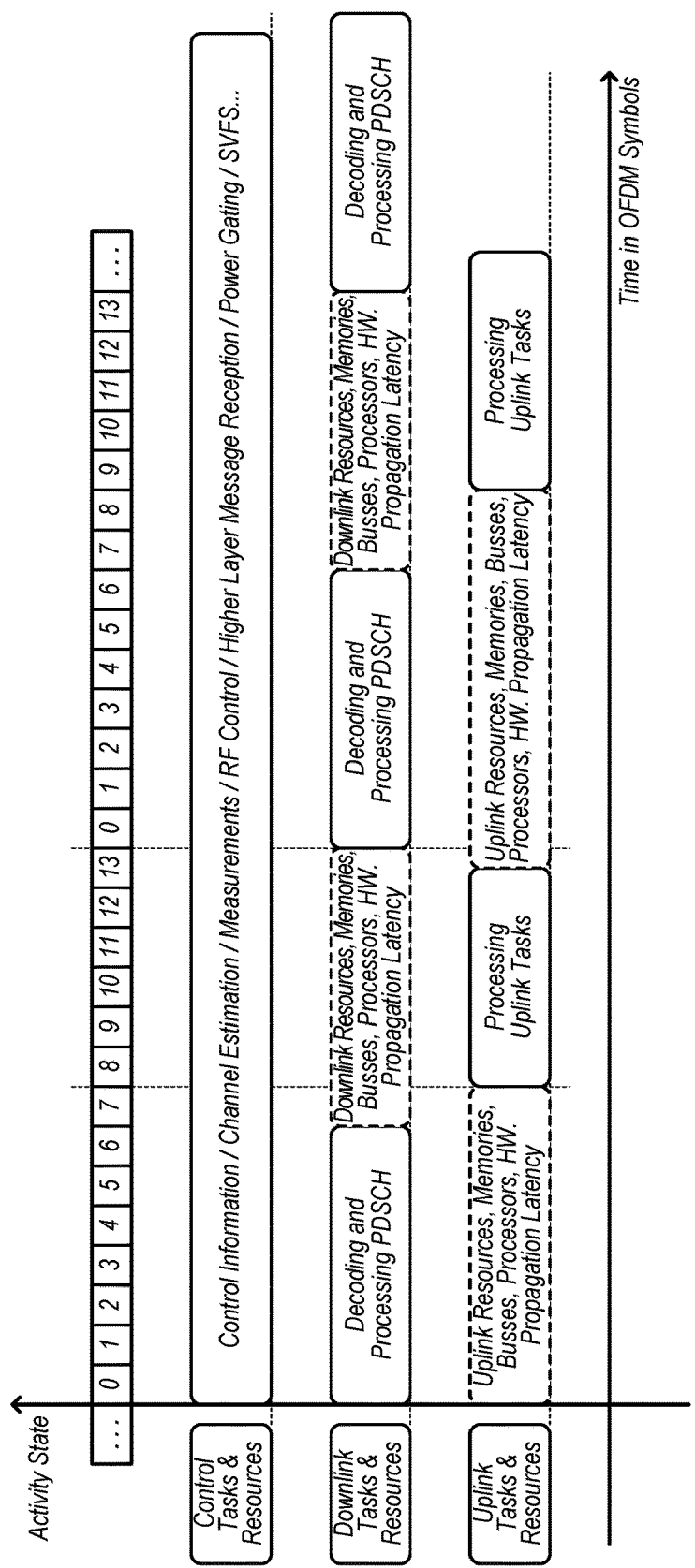
FIG. 5 illustrates the utilization of control, downlink and uplink resources of the prior art system architecture of FIG. 4, where the shaded boxes indicate wasted resource usage.

FIG. 5—Example Operation of Prior Art Cellular Modem Architecture

FIG. 5 illustrates an example operation of the prior art cellular modem architecture shown in FIG. 4. FIG. 5 illustrates cellular operations divided into control tasks, downlink tasks and uplink tasks for ease of illustration. FIG. 5 illustrates two 1 ms TTIs (Transmit Time Intervals) each with 14 OFDM symbols. During these TTIs the UE is receiving and transmitting, sometimes in parallel. As shown, the control, downlink and uplink (CTRL, DL, UL) channels are all active. The boxes with dashed lines represent operation of the respective logic after processing, wherein the resources are unused but remain active. All of the resources ranging from the higher software layers to the hardware (all system resources) are active whether or not the downlink/uplink is in a processing state. The boxes with dashed lines also include the time wasted in issuing requests from an upper software layer/lower software layer and delivering results to the lower software layer/upper software layer synchronized at time interval boundaries. Thus, in the timeline of FIG. 5 the boxes with dashed lines indicate waste of resource usage, resulting in unnecessary power consumption and reduced battery life.

More specifically, as shown in FIG. 5, the control resources are active all of the time in their normal power mode—none of the control resources are ever powered down or put in a low power mode. In the downlink, during OFDM symbols 0-6 of the first TTI the various downlink resources decode the primary downlink data channel, the PDSCH. After decoding of the PDSCH, for OFDM symbols 7-13 the downlink resources are not used but are on and consuming power, as indicated by the dashed box. This is repeated for the next TTI as shown. In the uplink, during each TTI for approximately symbols 0-7 in TTI 1 and symbols 0-8 in TTI 2 the uplink resources are powered on but are not in use.

In prior art architectures, the control, downlink and uplink operations are all performed in a single core, and hence the downlink and uplink cannot be selectively powered down when not in use.

Cellular Modem for Low Rate/Low Power Devices

As noted above, certain devices may have one or more of reduced size, reduced battery capability, or reduced power capability relative to other types of devices. Cellular modem chips that are marketed and sold today are designed for high data rates and high performance. As a result, the power consumption of current cellular modem chips is generally suboptimal for low power applications and/or devices. Accordingly, there is a need for a low power cellular modem, such as an LTE modem, that is capable of operating with lower power requirements and/or low transfer rates. There is also a need for a cellular modem for normal (high data rate) applications that consumes less power than current devices.

Many cellular systems, such as LTE systems, utilize different aspects of the system at different time intervals. In other words, downlink and uplink operations are not required to be active all of the time, but rather are in use sometimes and not in use other times. Some communication scenarios utilize only some part of the downlink and nothing from the uplink. This behavior may occur, e.g., when the UE supports half duplex mode.

Cellular activities can thus be thought of as semi-orthogonal, meaning that uplink activities do not necessarily depend on downlink activities, and vice versa. However, some feedback exists between the uplink and downlink to guarantee error free reception and transmission. For example, a UE may generate channel quality information (CQI) based on received downlink transmissions and transmit this CQI information in the uplink to the base station for use in adjusting future downlink transmissions. However, the feedback that exists between uplink and downlink operations does not occur at the physical layer, and uplink and downlink operations are generally separated in time such that uplink and downlink resources are often not required to both be operating at the same time.

Cellular (e.g., LTE) modem resources (memory, buses, processors, I/O-interfaces, etc.) are mapped or assigned to the performance of different cellular (LTE) tasks. Some cellular (LTE) scenarios (paging, airplane mode, data transfer, etc.) can be served by a subset of the resources. In this instance, it would be desirable for the unused resources to enter a low power state (e.g., off, less clocking, less voltage, etc.). Therefore, an improved cellular modem system architecture is desired which is able to opportunistically take advantage of scenarios when unused resources are able to be placed in a low power mode.

Figure 6:
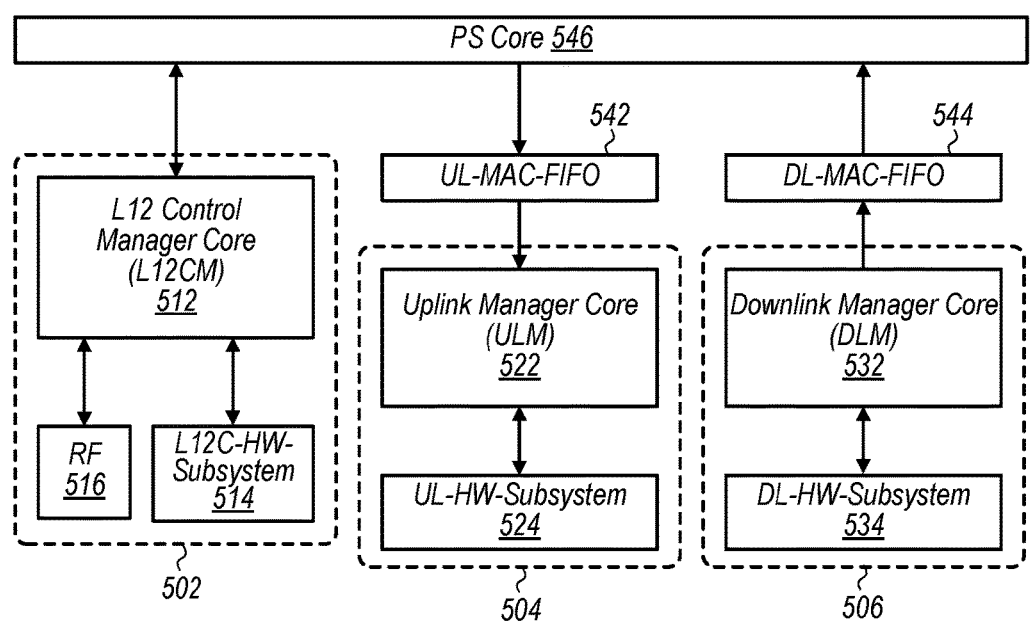
FIG. 6 is a block diagram illustrating an improved system architecture for a low power wireless device, according to some embodiments.

FIG. 6—Low Power Cellular Modem Architecture

FIG. 6 illustrates a low power cellular modem architecture according to some embodiments. As shown, the modem is divided into three orthogonal domains or modules, these being a control module (control manager module) 502, an uplink module (uplink manager module) 504, and a downlink module (downlink manager module) 506. Each of these modules is delineated by dashed lines. The control module 502 may comprise a control core 512, referred to as the L12Control Manager Core (L12CM), and may also comprise an associated controller hardware subsystem (L12C-HW-Subsystem) 514. The uplink module 504 may comprise an Uplink Manager Core (ULM) 522 and associated uplink hardware subsystem (UL-HW-Subsystem) 524. The downlink module 506 may comprise a Downlink Manager Core (DLM) 532, also referred to as the PDSCH (Physical Downlink Shared Channel) Manager Core, and may also comprise an associated downlink hardware subsystem (DL-HW-Subsystem) 534. The term "Module" as used herein has the full extent of its ordinary meaning and at least refers to a collection of one or more processor elements, hardware components, associated software, memory, etc. The term "Core" as used herein refers to a "Processing Element" or "Processor" as defined herein.

The L12Control Manager Core (L12CM) 512 is coupled to RF circuitry 516. The RF circuitry 516 is configured for performing RF communications. The control module 502 (e.g., the L12CM) may couple to a Protocol Stack (PS) Core 546. The uplink module 504 may couple through an Uplink Mac FIFO buffer (UL-MAC-FIFO) 542 to the PS Core 546. The downlink module 506 may couple through a Downlink Mac FIFO buffer (DL-MAC-FIFO) 544 to the PS Core 546.

Figure 7:
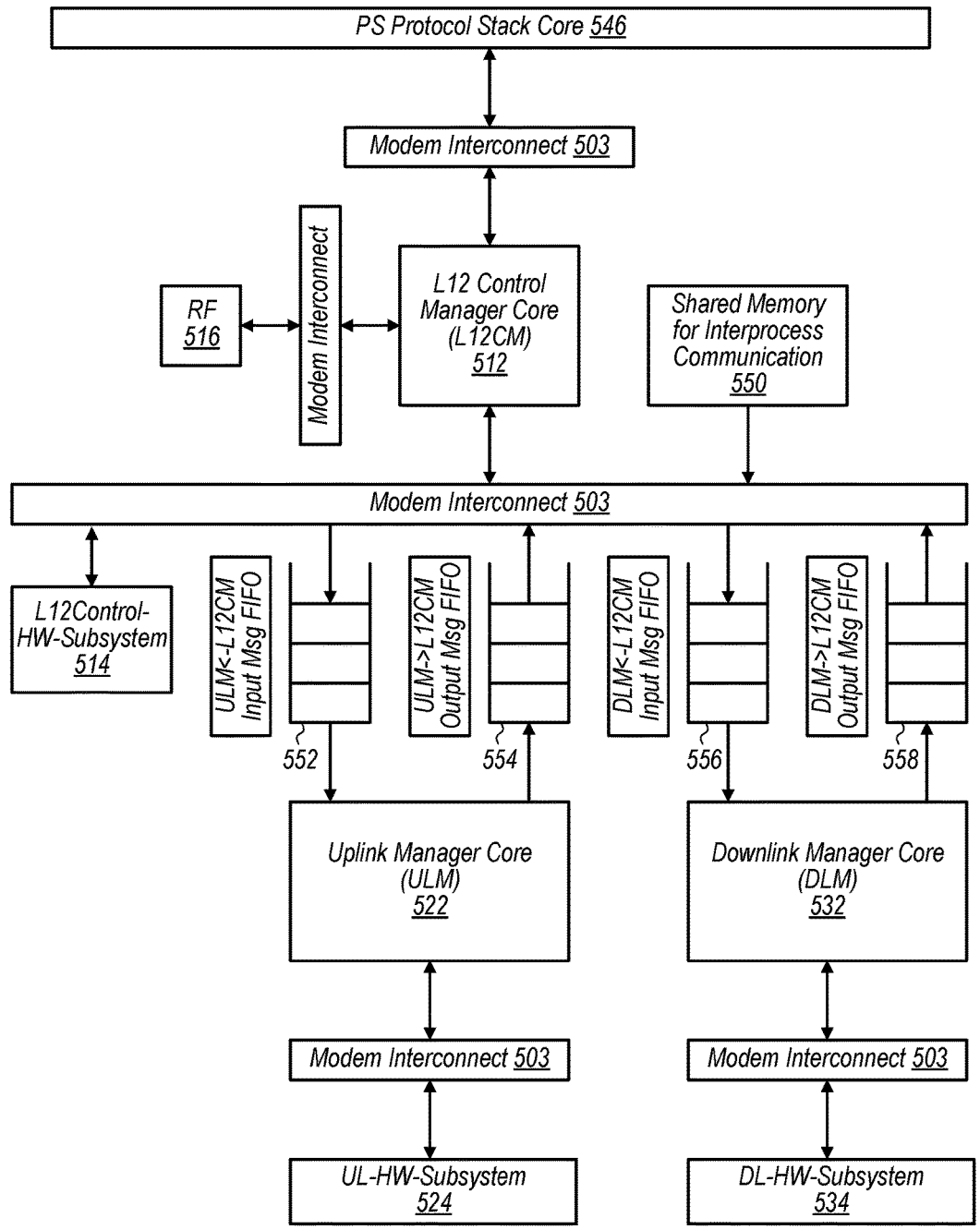
FIG. 7 is a block diagram illustrating an alternative view of the improved system architecture for a low power wireless device, according to some embodiments.

FIG. 7—Low Power Cellular Modem Architecture

FIG. 7 illustrates a more detailed block diagram of the cellular modem architecture of FIG. 6. FIG. 7 illustrates in greater detail the various FIFOs used to connect the ULM and the DLM to other parts of the system. As shown, the UL Manager Core (ULM) 522 couples to the L12 Control Manager Core 512 via two FIFOs, these being a ULM-L12CM input FIFO 552 and output FIFO 554. Also, the DL Manager Core couples to the L12 Control Manager Core 512 via two FIFOs, these being a DLM—L12CM input FIFO 556 and output FIFO 558.

Figure 8:
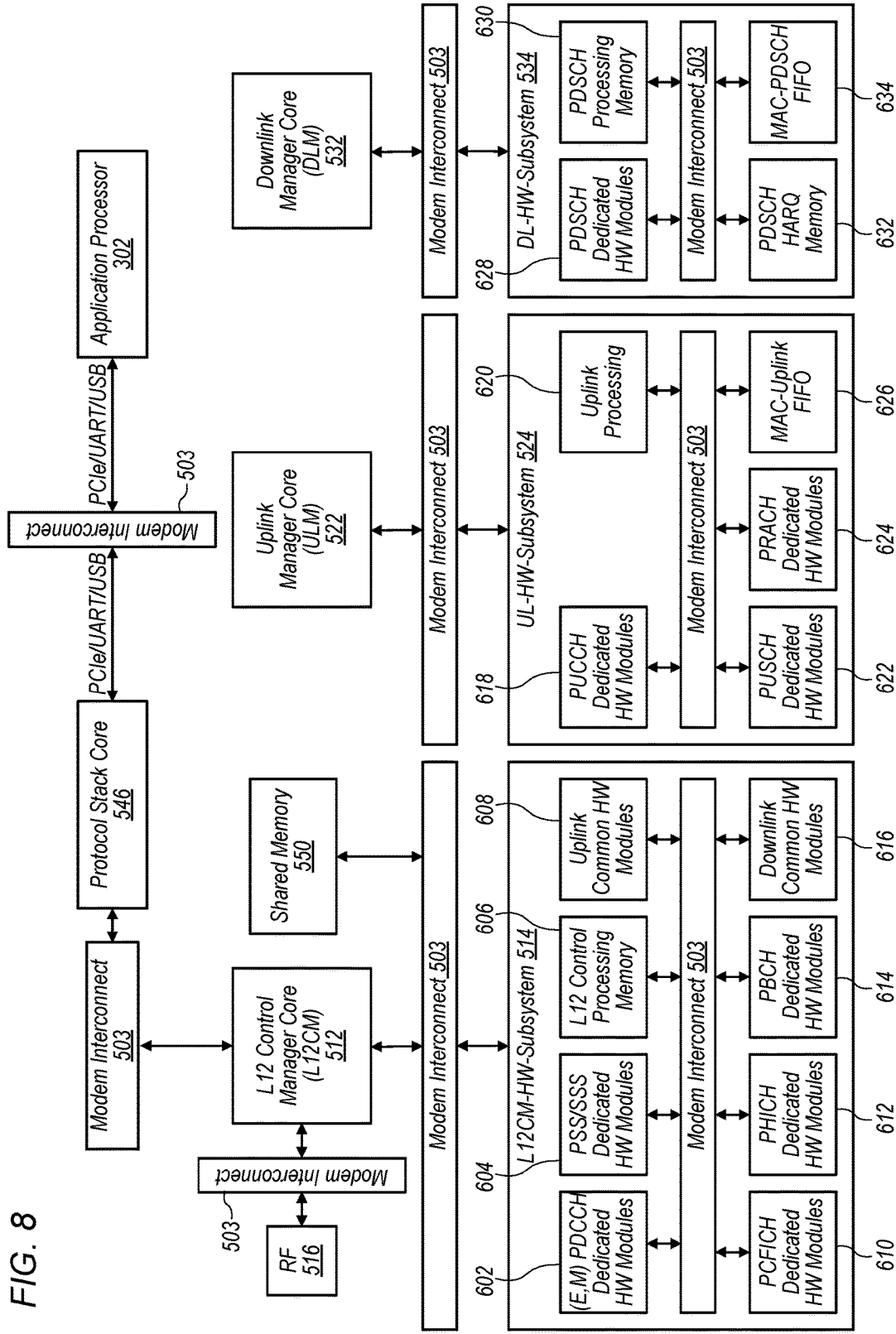
FIG. 8 is a more detailed block diagram illustrating an improved system architecture for the low power wireless device, according to some embodiments.

FIG. 8—Low Power Cellular Modem Architecture

FIG. 8 illustrates a more detailed block diagram of the low power cellular modem architecture of FIGS. 6 and 7, according to some embodiments. As shown and as discussed above, the cellular modem is divided into three orthogonal domains, these being a control module 502, an uplink module 504, and a downlink module 506 (these reference numerals are used in FIGS. 6 and 7). The control module 502 comprises a control core 512, referred to as the L12 Control Manager Core (L12CM) and associated controller hardware subsystem (L12C-HW-Subsystem) 514. The uplink module 504 comprises an Uplink Manager Core (ULM) 522 and associated uplink hardware subsystem (UL-HW-Subsystem) 524. The downlink module 506 comprises a Downlink Manager Core (DLM) 532, referred to as the PDSCH (Physical Downlink Shared Channel) Manager Core, and associated downlink hardware subsystem (DL-HW-Subsystem) 534. The L12 Control Manager Core (L12CM) 512 is coupled to the RF circuitry 516. The L12 Control Manager Core (L12CM) 512 is also coupled through a Protocol Stack Core 546 to the Application Processor 302 and its associated infrastructure.

FIG. 8 shows one example embodiment where each module or domain has a single core and an associated hardware subsystem. However, it is noted that in some embodiments one or more of the modules may have a plurality of cores and/or a plurality of associated hardware subsystems. For example, in some embodiments the uplink module 504 may have a plurality of UL Manager Cores (ULMs) 522 and/or a plurality of UL-HW-Subsystems 524. As another example, in some embodiments the downlink module 506 may have a plurality of DL Manager Cores (DLMs) 532 (also referred to as PDSCH Manager Cores) and/or a plurality of DL-HW-Subsystems 534. These additional cores/hardware subsystems may be included when a cellular modem with this system architecture is used in a more traditional platform such as a smart phone or tablet, e.g., where low power is not as much a requirement but is still a desirable feature, and high data rates and more advanced features, such as carrier aggregation, are desired.

The L12C-HW-Subsystem 514 may comprise a plurality of hardware components, such as (E,M) PDCCH dedicated hardware modules 602, PSS/SSS dedicated hardware modules 604, L12 Control processing memory 606, uplink common hardware modules 606, PCFICH dedicated hardware modules 610, PHICH dedicated hardware modules 612, PBCH dedicated hardware modules 614, and downlink common hardware modules 616, among possible others.

In some embodiments the control module (the L12CM) 512 may be coupled to the RF circuitry 516. The L12CM 512 may contain the control code for the RF circuitry 516, including code for programming the RF circuitry 516, selectively connecting the other modules (the uplink and downlink modules) to the RF circuitry 516 according to timestamps, a calibration table for calibrating RF operations, etc. The uplink/downlink common hardware modules 608 and 616 in the L12C-HW-Subsystem 514 may comprise logic for interfacing to the RF circuitry 516, including ADC/DAC buffers (receive/transmit buffers) which interface to the RF circuitry. These receive/transmit buffers may be shared components among all the three modules or domains, and the hardware of the three modules may have access to these buffers.

The UL-HW-Subsystem 524 may comprise PUCCH dedicated hardware modules 618, an uplink processing module 620, PUSCH dedicated hardware modules 622, PRACH dedicated hardware modules 624, and a MAC-uplink FIFO 626.

The DL-HW-Subsystem 534 may comprise PDSCH dedicated hardware modules 628, PDSCH processing memory 630, PDSCH HARQ memory 632, and a MAC-PDSCH FIFO 634.

As noted above, each of the ULM 522 and DLM 532 with their UL/DL-HW-subsystems 524 and 534 have access to the ADC/DAC buffers in the control module 502. The ADC/DAC buffers are used by the downlink module and uplink module for receiving/transmitting on the RF channel to the cellular network, e.g., from/to base stations in the cellular network.

Each of these three orthogonal modules or domains 502, 504 and 506 may comprise a dedicated set of all of the resources (memory, processors, busses, hardware, etc.) that it needs, and these dedicated resources for a particular domain (module) are not shared with other domains (other modules). If one core is switched off, then consequently all that core's resources in its own domain may be switched off as well. In other words, when a module is powered down, the core or processing element and all of its associated hardware resources may be powered down. In some embodiments, one of the uplink module or downlink module may be powered down without affecting the operation of the other module. In other words, the uplink module may be powered down without affecting the operation of the downlink module, and the downlink module may be powered down without affecting the operation of the uplink module.

As noted above, instead of having a single monolithic memory used by all of the modules, in some embodiments each module contains the memory that it needs. Thus when a module is switched off its associated memory is switched off as well. Memory tends to consume a significant amount of power, and the ability to power down a portion of the memory that is not in use results in significant power savings.

Each module (or each core) 502, 504 and 506 may have its own control/configuration software. Each core (processing element) 512, 522 and 532 may independently schedule the tasks for the domain's lower level components. The tasks may be scheduled in a hierarchical manner, much like a tree structure with one root and one level of branches. The architecture shown in FIG. 8 has no need for the components as in the other two architectures. As noted above, the three modules 502, 504 and 506 are orthogonal, with one aspect of this orthogonality being that each module can be powered off independently of the other modules.

The control module 502 may be always on when the UE 106/107 is powered on, and the control module 502 may selectively turn on and power down the uplink module 504 and downlink module 506 as needed. Note that the term "power down" may refer to placing them in a low power state or turning these modules completely off. The control module (or the L12CM core in the control module) thus controls the lifecycle of the uplink and downlink modules 504 and 506. The LTE-air-interface (the downlink control channel transmitted by the cellular network) contains sequential/parallel control/configuration information for scheduling the receiving/transmitting of DL/UL data by the UE. The control module 502 (e.g., the L12CM) wakes up the uplink module 504 and/or downlink module 506, or more precisely wakes up the ULM 522 and/or DLM 532, and delivers configuration data to them only if their existence is needed, otherwise they will be powered off (or powered down).

In at least some embodiments, the system of FIG. 8 has no need for, and does not contain, a real time operating system (RTOS) with its overhead and context switching. Each core has a dedicated task, e.g., a control core 512 which performs control tasks, an uplink core 522 which performs uplink tasks, and a downlink core 532 which performs downlink tasks. These separate, dedicated orthogonal modules (and associated separate cores) produced the desired parallelism for dealing with UL/DL/Control operations, and hence there is no need for a RTOS to schedule resources for these different operations.

In at least some embodiments, no resource sharing is performed among the three modules or domains. In other words, each module or domain is orthogonal to the other domains with respect to its resources. The common resources (resources that are common to both uplink and downlink) belong to L12CM which prepares everything for the other two domains (the UL and DL domains).

L12 Control Manager Core/Module

The L12 Control Manager Core may perform various tasks such as: handling/dispatching of higher layer messages; controlling/configuring L12 downlink control channels (E,M)DPCCH, PCFICH, and PHICH; controlling/configuring common data path hardware components; configuring/controlling PSS/SSS/PBCH; performing measurements; performing channel estimation/loops; managing the L12 Control-HW-Subsystem resources and power gating; and controlling the RF hardware. The L12 Control Manager Core may have three states, these being On, Off, and Low Power (LP). The L12 Control Manager Core may be in the On state during all LTE scenarios, except when LTE is in IDLE mode, where the L12 Control Manager Core is in the LP state. The L12 Control Manager Core may be in the Off state only when performing a "cold" start. Each of these tasks is discussed in greater detail below.

The L12 Control Manager Core may perform handling and dispatching of higher layer (RRC or MAC) messages using flat control code, i.e., control code without any hierarchical layers. The L12 Control Manager Core may process all the messages in one single domain (module) and then dispatch the modified versions of the messages to their final destination domains (modules). There may be only one receiver per message, and this receiver may not share any information of the message with the other modules. The L12 Control Manager Core may not perform state sharing, which entails that no global scheduling is required, and also no global resource management is required. Since there is no low level coordination among different modules, power saving decisions are local to every domain (or module).

The L12 Control Manager Core may perform receiving/processing of the downlink control channel(s). The downlink control channel (the PDCCH) comprises information from the network side that may indicate the operation that the UE should perform. The L12 Control Manager Core monitors the downlink control channel(s) and then initiates operation of either the downlink module or the uplink module as appropriate.

For example, the downlink control channel (the PDCCH) may indicate that a downlink data channel is scheduled to contain data targeted for the UE, in which case the L12 Control Manager Core may direct the downlink module to power on and monitor the PDSCH at the appropriate time for the received data. As noted above, the DLM and its associated DL-HW-Subsystem has access to the ADC/DAC buffers on the control module which are used for receiving and transmitting on the RF channel. Thus the downlink module can monitor the PDSCH by monitoring those buffers.

In some embodiments, the L12 Control Manager Core may generate a configuration for the downlink module which specifies how the downlink module should be configured to receive and process the incoming data. The L12CM may place the configuration in a buffer in the downlink module, whereby when the downlink module wakes up it can access this configuration and configure itself accordingly. The configuration may comprise the downlink control information (DCI) provided as a payload on the PDCCH, and may contain instructions or parameters (e.g., a map) that can be used by the UE to locate and decode its respective data in the PDSCH, which is a shared data channel. The configuration may comprise information about the modulation scheme being used on the PDSCH, transport block size, and other parameters. Stated another way, the PDCCH may include downlink scheduling grant information which is received by the L12CM. The L12CM may also receive various higher layer parameters due to its handling of higher layer messages. The L12CM may combine the downlink scheduling grant information and the higher layer parameters in creating the configuration for use in decoding the PDSCH.

Alternatively, the downlink control channel may contain uplink grants indicating that the UE is being granted permission to perform uplink communications. In this instance, the L12 Control Manager Core may direct the uplink module to power on at the scheduled time to perform the uplink communications. The uplink module may generate and provide the uplink data to the ADC/DAC buffers on the control module for uplink transmission through the RF circuitry. In some embodiments, the L12 Control Manager Core may generate a configuration for the uplink module which specifies how the uplink module should be configured in performing the uplink communications. This configuration may be obtained from the downlink control information (DCI) provided as a payload on the PDCCH, which contains the uplink scheduling grant information. This configuration may comprise instructions or parameters (e.g., a map) that can be used by the UE to encode and transmit on the PUSCH. The configuration may comprise information about the modulation scheme being used on the PUSCH, transport block size, and other parameters. Stated another way, the PDCCH may include uplink scheduling grant information which is received by the L12CM. The L12CM may also receive various higher layer parameters due to its handling of higher layer messages. The L12CM may combine the uplink scheduling grant information and the higher layer parameters in creating the configuration for use in decoding the PUSCH.

as well as various higher layer parameters that are provided for use in transmitting uplink data on the PUSCH.

In some embodiments, the L12 Control Manager Core may monitor the following channels: (E,M) PDCCH, PCFICH, PHICH. The term "(E,M) PDCCH" refers to the PDCCH, the EPDCCH and the MPDCCH. The PDCCH is the primary channel that is monitored by the control module (the L12 MC) as this channel contains information regarding what downlink/uplink operations are to be performed. The L12 Control Manager Core may use information obtained in the PDCCH to selectively power on/power down the uplink and downlink modules to perform certain tasks or go to sleep. The L12 Control Manager Core may also monitor the PCFICH (Physical Control Format Indicator Channel), which contains the control channel format for the PDCCH and the PHICH, and the PHICH (Physical Hybrid-ARQ Indicator Channel), which contains HARQ acknowledgements.

The L12 Control Manager Core may configure its L12CM-HW-Subsystem to receive L1/L2 downlink common control channels. As noted above, the control information received by the L12 Control Manager Core may be dispatched to the ULM or/and DLM cores only if required. In some embodiments, the L12 Control Manager Core may initiate, or power on or "wake up" the uplink and downlink modules using respective interrupts.

The L12 Control Manager Core may control/configure the common components of the uplink and the downlink. In other words, the control module, e.g., L12 Control Manager Core and its associated hardware subsystem, may contain certain hardware and/or software functionality that is common to uplink communications and other functionality that is common to downlink communications. For different physical channels, this common functionality may be configured and controlled by L12CM without waking up the other two cores ULM/DLM with their respective HW domains. The common uplink/downlink functionality might be for example scrambling, certain aspects of rate matching, etc.

The L12 Control Manager Core may control the timing of waking up the ULM and DLM cores. Upon reception of any scheduling assignment for DL as determined by monitoring the PDCCH, the L12 Control Manager Core may determine a DL-configuration for the DLM core and place this DL configuration in a buffer in the downlink module. The L12CM then wakes up the DLM core (possibly with a new interrupt to the DLM) just prior to when the downlink module is needed to monitor the PDSCH to receive and perform DL processing on the incoming DL data on the PDSCH. In other words, the L12CM may receive an indication of the arrival of downlink data on the PDCCH and create and store a configuration in a buffer of the downlink module, but the L12CM may only wake up the downlink module (the DLM core) just prior to when the data is scheduled to appear on the PDSCH. This results in power savings, since the downlink module is not unnecessarily consuming power while waiting for its data to arrive. Similarly, if the L12 Control Manager Core receives uplink scheduling grants, it may create a configuration for the ULM core and place this UL configuration in a buffer in the Uplink module. The L12CM then wakes up the ULM core (e.g., with an appropriate interrupt) just prior to when the uplink communication is scheduled to perform the processing of the transport block for UL transmission. Again, this results in power savings, since the uplink module is not unnecessarily consuming power while waiting to perform its uplink communications pursuant to the received uplink grant. Thus the L12CM essentially performs a "just in time" wake up of each of the DL and UL modules.

The L12 Control Manager Core may perform common signal processing, such as channel estimation, automatic gain control (AGC), TTL, FTL, Loops and measurements.

The L12 Control Manager Core may operate to configure/control the RF hardware. The L12 Control Manager Core may be the only core to configure and control the RF, and may have a single module to perform this task. In some embodiments, switching on/off the RF hardware is done locally by the L12 Control Manager Core. Thus the power saving modes can be applied dependent on the particular scenario. Making RF decisions locally leads to fast application of those decisions without requiring coordination with any other modules.

The L12 Control Manager Core may perform control the L12C-HW-Susbsystem, and in particular the power gating (or powering up/down) of hardware components in the L12C-HW-Subsystem. In other words, the L12 Control Manager Core may have the ability to turn on/off individual hardware components of the L12C-HW-Susbsystem. If the L12CM core sees, according to its sole scheduling, that any hardware module of the L12C-HW-Susbsystem is not needed, it may switch this hardware module off (i.e., power down this hardware module).

The L12 Control Manager Core may operate to process the PSS/SSS/PBCH in order to ensure the UE stays synchronized to the network. The PSS (Primary Synchronization Signals), the SSS (Secondary Synchronization Signals) and the PBCH (Physical Broadcast Channel) are transmitted by the network and used by the UE to maintain synchronization with the network. These synchronization signals are not related to either uplink or downlink transmission, and thus are handled in the control module. The control module processes the PSS/SSS/PBCH without the need to wake up the uplink or downlink modules.

The L12 Control Manager Core may have only one layer of software inside. Accordingly, there may be only one entity (L12Control) which decides/requests/executes/evaluates the various operations performed in the core. The core thus also may have no latency with respect to its associated HW-Subsystem. Since the L12 Control Manager Core implements a flat software system (software without hierarchical layers), power saving decisions may be relatively easy, and no interaction among different entities may be needed to decide whether a resource needs to be off, on, or in low power mode.

Control Domain (L12CM and its Domain)—Problems and Solutions: System Aspect

The following describes certain problems associated with the prior art architecture of FIG. 4 from a "system" point of view, i.e., from the perspective of the software architecture and system resources.

In the prior art architecture:

Horizontal software layers perform scheduling and thinking for lower layers; this results in coordination overhead between the layers and delays due to resource conflict scheduling.

Software layers may be mapped either to processors or to separate threads. A layer communicates with another layer through shared memory accompanied by interrupts or through a RTOS FIFO;

DL, UL, and Control functionality exist in every software layer but with different types of abstraction. To resolve conflicts on system resources in every layer, either multiple threads are used or alternatively a conflict handler is used with a number of registering tables;

Results are propagated from lower levels to upper levels causing delays in feedback loops;

Power is consumed in the bus and dual memory is required for inter-processor communication even when the processors are not communicating.

The following describes certain advantages of the improved cellular modem architecture shown in FIG. 8 from a "system" point of view, i.e., from the perspective of the software architecture and system resources. These advantages may be present in certain embodiments, and may not be present or required in other embodiments. In the improved low power cellular modem architecture according to some embodiments:

There may be no software layers. In other words, the software hierarchy may be flat, which may remove software overhead associated with message passing between layers and delays due to inter-layer coordination and communication. The elimination of software layers may also remove the need for FIFOs and shared memories to interface between the layers. This may also reduce the total amount of software used in the system, which in some embodiments is roughly half the amount used in prior art systems.

Every core may have its own scheduler, and scheduling one core may be unrelated to scheduling of another core. Thus a respective core, such as the UL or DL core, can schedule its own resources in an improved manner without interference from another module.

No global resource management or global conflict handling may be performed. Each module may have its own set of dedicated resources, which may remove resource conflict issues. Decisions to forward messages or data may be performed quickly, and thus power switching modes can be done with reduced latency.

The device may not require or utilize a RTOS with all of its resources and associated overhead. Thus cycles are not wasted in performing context switching and other overhead associated with an operating system.

The device may have less memory and less cores, saving power and area. For example, in some embodiments the cellular modem does not employ cache systems for at least the uplink and downlink modules. The memory in each of the uplink and downlink modules may be sufficiently small such that caches are not needed. In one embodiment the total amount of memory used in all of the modules is 1 Mbyte.

Results produced by a core may remain in that core e.g., the uplink modules may not be required to share their results with the downlink modules, and vice versa. Feedback decisions can be taken locally. Power saving modes depending on results can be done without latency, e.g., a module may be quickly powered down once its task is complete. For example, the control module may quickly power down the UL or DL module after it has completed its task, e.g., after the UL/DL module has completed its interrupt service routine and notified the control module of its completion. Alternatively, in some embodiments, when either the UL or DL module completes a task the UL or DL module may have the ability to independently power itself down without seeking permission from the control module.

The bus and the dual shared memory may be used only when more than one core is active. If only one module is active, then there may be no need for a common bus (an inter-module bus) to be active, since the active module has no need to communicate on the bus with the other inactive modules. If in some embodiments a shared memory exists to all the UL and DL cores to pass messages or data to each other, if only one module is active then there may be no need for this shared memory to be active, since the active module has no need to utilize the shared memory to communicate with the other inactive modules.

The following describes power saving aspects of the low power cellular modem architecture from a "system" point of view according to some embodiments. The improved low power cellular modem architecture may have the following characteristics according to some embodiments:

Physical separation of sequential and orthogonal tasks, which allows for sequential/partial powering on of hardware components. In other words, the architecture may be such that the UL and DL modules will generally operate in a sequential manner, thus allowing one to be powered down while the other is operating. The architecture design may also operate to save power even in the scenario where the DL and UL must be on all the time, due at least in part to the flat (non-hierarchical) software structure, reduced inter-system communication and bus usage, and other improvements described herein.

Elimination of housekeeping/overhead software which may prevent the system from making/taking fast power mode decisions/actions. This includes the elimination of an operating system and well as software layering.

Reduction of wasted resources used for conflict handling/layer oriented scheduling and interprocessor communication. This may also result in less code memory, less caches, and less data memory.

Control Domain (L12CM and its Domain)—Problems and Solutions: Functionality Aspect The following describes certain problems associated with the prior art architecture of FIG. 4 from a "functionality" point of view.

With respect to Higher Layer Message Handling:

In the prior art architectures: the entire modem is in the On state virtually all of the time; three separate modules are involved in processing messages, these being the message handler, the activity scheduler, and the power saving scheduler; and different versions of the message propagate from L1C→FW→HW-Driver.

In the Low Power Architecture in some embodiments: the L12CM is in the On state most of the time, whereas the ULM and DLM may not be. The control module may have a single core that processes messages, which differs from the three separate modules discussed in the above paragraph. This may reduce inter-process communication and other overhead. Also, there may be no need for an activity/sleep scheduler. Instead the control core may control the power state of the uplink and downlink cores. Further, the software architecture may be flat, with no layering—only one flat module may handle/process messages.

The power saving aspect of the Low Power Architecture may be at least as follows in some embodiments: only portions or subsets of the modem may be required to be powered on at any given time; flat software without hierarchical layering may result in fast power saving decisions; and conflict/scheduling software may not be needed, resulting in less MIPS requirements and less memory.

With respect to Receiving/Processing of Control PHY Channels:

In the prior art architectures: the entire modem is in the On state virtually all of the time; all the software and the cores are involved in receiving and processing PDCCH; in the case of transitioning to a low power state after PDCCH/PSS/SSS/PBCH, the request propagates through different layers causing a latency due to inter-layer communication.

In the Low Power Architecture in some embodiments: only the L12CM is in the On state most of the time; only a single module may be used per control PHY channels, and no housekeeping software may be involved; and when the module (domain) has completed its processing, the module and all of its lower components can enter the off-state.

The power saving aspect of the Low Power Architecture may be at least as follows in some embodiments: only portions or subsets of the modem may be required to be powered on at any given time; the design of orthogonal modules enables fast power saving decisions; and separate tree structures with decisions on the root enables power mode decisions to be easily applied downward to various hardware components.

With respect to Common Signal Processing/RF Control:

In the prior art architectures: the entire modem is in the On state virtually all of the time; different modules and cores are involved in signal processing; results are propagating upward to higher software layers, e.g., HW-driver→FW→L1C. Utilizing the results involves propagating the results downward to lower software layers, which necessitates a large amount of software involvement.

In the Low Power Architecture in some embodiments: only the L12CM may be in the On state most of the time; only a single module may be used per signal processing aspect; the results may be buffered, post-processed, and applied by the same entity (or module); and no intervening handler/layer may be used in some embodiments.

The power saving aspect of the Low Power Architecture may be at least as follows in some embodiments: only portions or subsets of the modem may be required to be powered on at any given time; no copying of large data may be needed, rather one entity (one module) has the results, thus requiring less memory; and different modules or portions of the cellular modem can start/stop quickly.

UL Manager Core (ULM) Domain

The UL Manager Core (ULM) may perform various tasks in some embodiments, such as: scheduling for uplink activities; controlling/configuring uplink physical channels PUCCH, PUSCH, and PRACH; controlling/configuring the uplink dedicated data path; managing UL-HW-Subsystem resources and power gating; and managing the MAC uplink buffer. The UL Manager Core (ULM) may have two states, these being On and Off. The UL Manager Core (ULM) may be in the On state during PUCCH/PUSCH activities. The UL Manager Core (ULM) may be in the Off state if uplink communication is completed or there is no uplink. Each of these tasks is discussed in greater detail below.

The ULM may perform scheduling for uplink activities. The L12CM may wake up the ULM only in the instance when there is an uplink grant. The L12CM may also deliver to the ULM the configuration as well (for the PUSCH use case). Similarly, the L12CM may deliver to the ULM the configuration if a PRACH is scheduled or PUCCH transmission is to occur. The ULM core may schedule the tasks for the uplink-dedicated SW modules, and the scheduled software modules may configure/control the Uplink Hardware components. As soon as the transport block is transmitted, the ULM may then switch off all the resources lying in its domain.

The memory managed by the ULM may include uplink processing memory and the DL-MAC-FIFO (Downlink Media Access Control FIFO). The hardware components managed by the ULM may include the PUCCH data path, the PUSCH data path, and the PRACH data path. Alternatively, in some embodiments the ULM may control/execute only the PUSCH channel, and the PUCCH and PRACH processing may be moved to the L12CM core. The architecture described herein is thus very flat (non-hierarchical), where most or all of the signal processing of the inner receiver and the PHY control channels may be concentrated in the L12CM core, and in some embodiments the ULM and DLM only operate with the physical (PHY) data channels. This is especially useful in the case where DL activity occurs with only an ACK/NACK being received in the UL. In that case only 2 cores need to be awakened.

When transmitting uplink, the ULM and all of its domain may be powered on for less than one slot. The system may consume approximately 40% of the power of a traditional prior art architecture where the uplink operates until the end of the TTI (Transmit Time Interval). When there is no uplink to be scheduled, the ULM and all its domain is powered off. This results in 0% power consumption, as compared to a prior art architecture that allows the uplink domain to run until the end of the TTI and thus unnecessarily consumes power during this time.

DL Manager Core (DLM) Domain (PDSCH Manager Core)

The Downlink Manager Core (DLM) (or PDSCH Manager Core) may perform various tasks such as: scheduling for downlink activities; controlling/configuring the downlink physical channel—PDSCH; controlling/configuring the downlink dedicated data path; managing PDSCH-HW-Subsystem resources and power gating; and managing the MAC downlink buffer. The PDSCH Manager Core (DLM) may have two states, these being On and Off. The PDSCH Manager Core (DLM) may be in the On state during PDSCH activities, and may be in the Off state if PDSCH processing is being performed or there is no PDSCH.

The DL Manager Core may perform scheduling for PDSCH activities. The L12CM may wake up the DLM only in the instance when there is a scheduling assignment. The L12CM may also deliver to the DLM the configuration to be used for the DL communication. The DL Manager Core may schedule the tasks for the PDSCH-dedicated SW modules, and the scheduled modules may configure/control the DL hardware components. When the transport block is received on the downlink, the DLM may insert the block into the DL-MAC-FIFO. After receiving the transport block on the downlink and inserting the block into the DL-MAC-FIFO, the DLM may then switch off all the resources lying in its domain.

The memory managed by the DLM may include the PDSCH processing memory, the HARQ buffer, and the DL-MAC-FIFO. The hardware components managed by the DLM may include the LLR buffer, rate matching logic, and turbo decoder logic, among others.

When receiving data on the PDSCH, the DLM and all of its domain may be powered on for one slot. The system may consume 50% of the power of a prior art architecture that allows the PDSCH domain to operate until the end of the TTI. When the PDSCH is not scheduled to be received, the DLM and all its domain may be powered off. This results in very low (near 0%) power consumption, as compared to a prior art architecture which allows the PDSCH-domain to operate until the end of the TTI and thus unnecessarily consumes power during this time.

Figure 9:
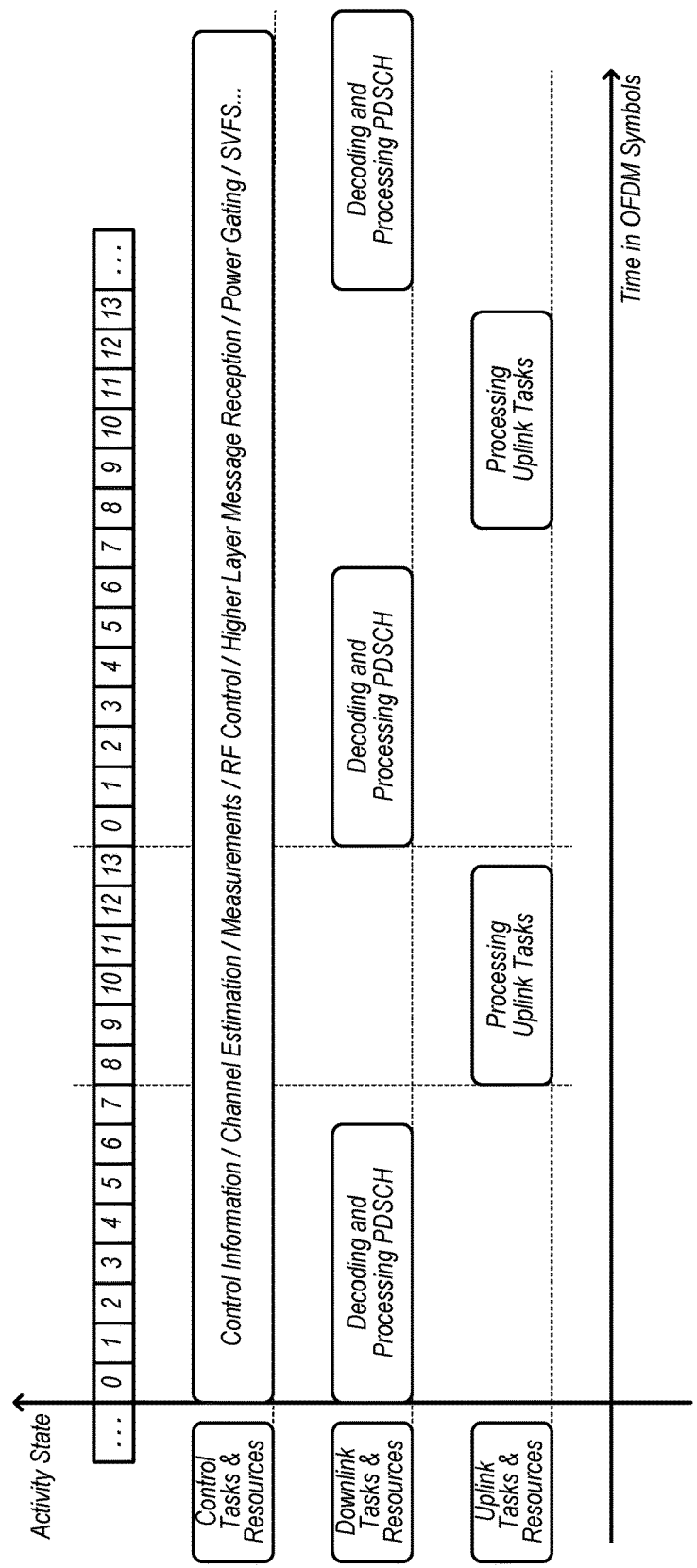
FIG. 9 illustrates the utilization of control, downlink and uplink resources according to the system architecture of FIG. 8 according to some embodiments.

FIG. 9—Cellular Modem Low Power Architecture Use Case

FIG. 9 illustrates a timeline that shows a use case for the low power cellular modem architecture according to some embodiments, where both the uplink (UL) and downlink (DL) are active. This is an excerpt of a general use case where data is transmitted and received, such as in a VoLTE call, utilizing x Mbps downlink and y Mbps uplink at the same time.

As shown, the L12CM domain (Control Tasks and Resources) may be active to receive the control information and deliver them to both the DLM and ULM. The L12CM domain may perform all the tasks related to signal processing of the inner receiver and to the common transmit/receive portion.

As shown, the L12CM may wake up the DLM directly prior to OFDM symbol 0 to process the PDSCH. The DLM may then spend 7 OFDM symbols (symbol 0 to symbol 6) processing the PDSCH. In OFDM symbol number 6, the DLM may switch off its domain and go into sleep mode.

As shown, at OFDM symbol 0 the ULM may switch off its domain and enter sleep mode. The L12CM may wake the ULM at OFDM symbol 8, which is 6 slots before the transmission of the uplink.

Referring again to FIG. 5, the wasted resources are delineated with boxes having dashed lines. The prior art architectures in FIG. 4 cannot switch off resources because of the various software complexities involved, including the software layering, sharing of hardware resources, and the RTOS.

Figure 10:
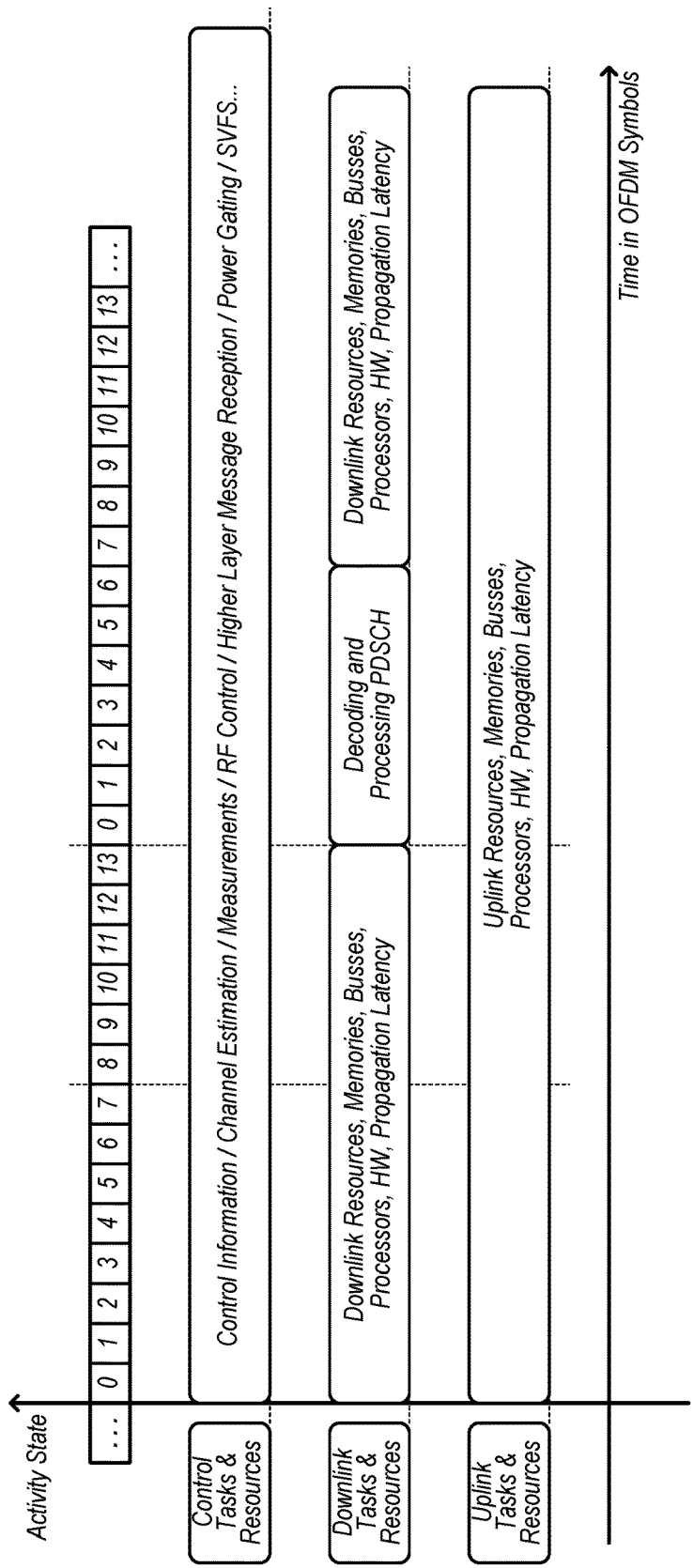
Figure 11:
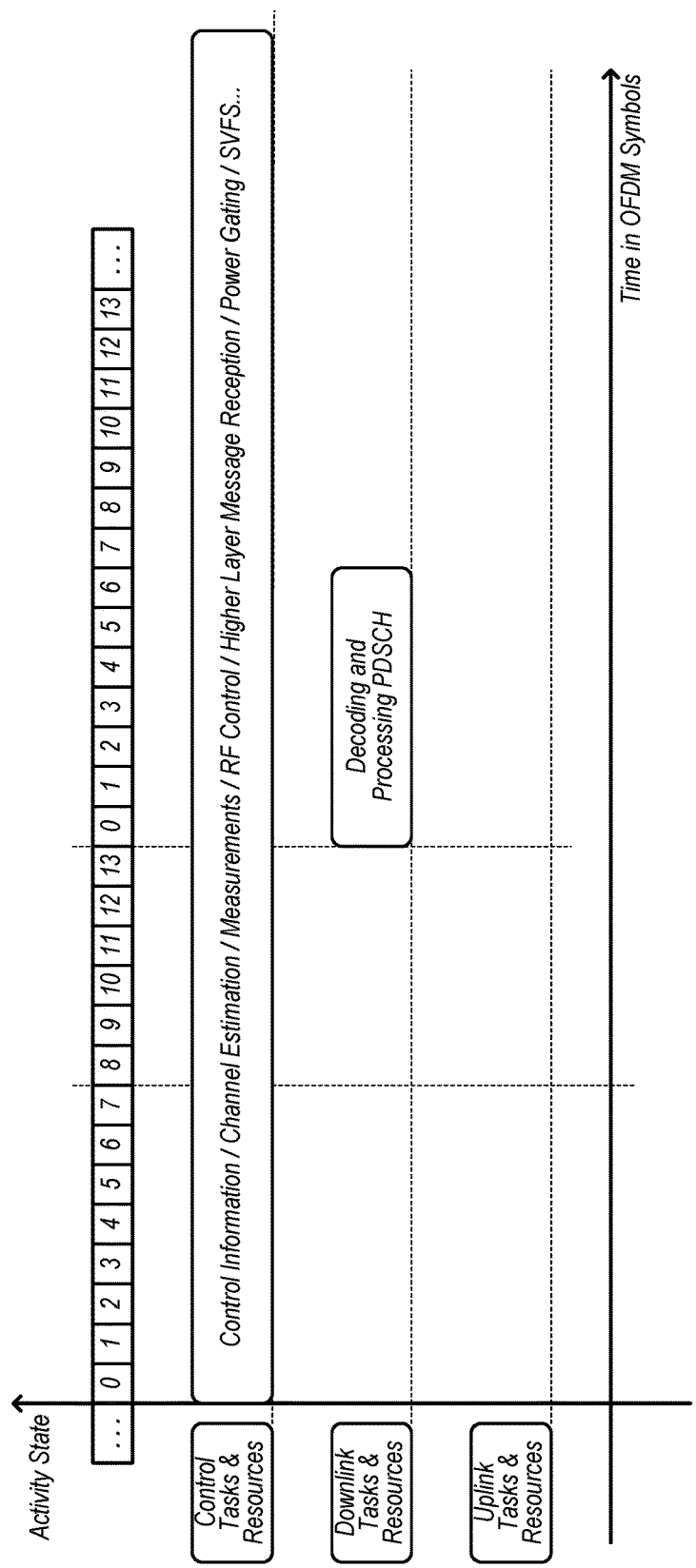

FIGS. 10 and 11—Cellular Modem Low Power Architecture Paging Use Case

FIGS. 10 and 11 illustrate contrasting examples of a timeline that shows a paging use case for the low power cellular modem architecture as compared to a traditional prior art architecture, according to some embodiments. FIG. 10 is a timeline that shows operation of the traditional prior art cellular modem architecture of FIG. 4 performing a paging operation. FIG. 11 is a timeline that shows operation of the low power cellular modem architecture of FIG. 8 performing a paging operation in some embodiments.

During page monitoring, the UE may decode the PDCCH followed by the PDSCH in order to determine whether or not there is a paging (incoming phone call) designated for the UE. If there is no paging, then the UE may go into a sleep mode for a specified number of LTE frames.

As shown in the timeline of FIG. 10, using the traditional prior art cellular modem architecture of FIG. 4, power is unnecessarily consumed by housekeeping resources for the downlink (downlink resources, memories, buses, processors, and other hardware), and also power is unnecessarily consumed by housekeeping resources for the uplink (uplink resources, memories, buses, processors, and other hardware). Further each of the downlink and uplink hardware have undesirable propagation latencies that further consume power.

As shown in the timeline of FIG. 11, using in the low power cellular modem architecture (LP LTE architecture) of FIGS. 6-8, the DLM may operate with reduced power requirements. In particular, decoding and processing of the PDSCH may occur during the second set of OFDM symbols 0-6 and can otherwise be turned off. The ULM and all of its resources may not be started at all since they are not necessary when decoding an incoming paging message.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A modem for use in wireless communications, comprising:
    a control manager module comprising a control processor and an associated control hardware subsystem coupled to the control processor;
    an uplink manager module, wherein the uplink manager module is coupled to the control manager module, wherein the uplink manager module is configured for use in performing wireless uplink communications, and wherein the uplink manager module comprises an uplink processor and an associated uplink hardware subsystem coupled to the uplink processor; and
    a downlink manager module, wherein the downlink manager module is coupled to the control manager module, wherein the downlink manager module is configured for use in performing wireless downlink communications, and wherein the downlink manager module comprises a downlink processor and an associated downlink hardware subsystem coupled to the downlink processor;
    a port coupled to the control manager module and configured for coupling to radio frequency (RF) communication circuitry;
    wherein the control manager module is configured to monitor a downlink control channel to obtain scheduling information regarding what downlink or uplink operations are to be performed;
    wherein each of the uplink manager module and the downlink manager module is configured to be separately powered down by the control manager module without affecting operation of the other of the uplink manager module and the downlink manager module, and wherein said powering down is performed based on the scheduling information obtained from the downlink control channel, wherein powering down the uplink manager module comprises turning off the uplink processor, wherein powering down the downlink manager module comprises turning off the downlink processor,
    wherein turning off the uplink processor operates to power down hardware resources in the associated uplink hardware subsystem, and
    wherein turning off the downlink processor operates to power down hardware resources in the associated downlink hardware subsystem,
    wherein each of the control manager module, the uplink manager module, and the downlink manager module comprises its own configuration software,
    wherein the configuration software in each of the control manager module, the uplink manager module, and the downlink manager module independently schedules tasks for its respective module using respective hardware resources in its associated hardware subsystem,
    wherein the configuration software in each of the control manager module, the uplink manager module, and the downlink manager module does not comprise hierarchical layers, and
    wherein the control manager module is configured to separately power down the uplink manager module and the downlink manager module without conducting global scheduling and global resource management.

2. The modem of claim 1,
    wherein the control manager module is configured to selectively power on and power off each of the uplink manager module and the downlink manager module based on whether uplink or downlink communications are required.

3. The modem of claim 1,
    wherein the control manager module is configured to selectively power off the uplink manager module when uplink communications are not needed;
    wherein the control manager module is configured to selectively power off the downlink manager module when downlink communications are not needed.

4. The modem of claim 1,
    wherein the uplink manager module is configured to be separately powered down from the downlink manager module such that the downlink manager module can operate while the uplink manager module is powered down;
    wherein the downlink manager module is configured to be separately powered down from the uplink manager module such that the uplink manager module can operate while the downlink manager module is powered down.

5. The modem of claim 1,
wherein the uplink manager module comprises a first plurality of hardware resources configured to perform uplink tasks;
wherein the downlink module comprises a second plurality of hardware resources configured to perform downlink tasks;
wherein the first plurality of hardware resources is separate from the second plurality of hardware resources such that no hardware resources are shared between the uplink module and the downlink module.

6. The modem of claim 1,
wherein the uplink processor is configured to selectively turn off certain hardware components in the uplink hardware subsystem that are not being used in uplink communications;
wherein the downlink processor is configured to selectively turn off certain hardware components in the downlink hardware subsystem that are not being used in downlink communications.

7. The modem of claim 1,
wherein the control hardware subsystem comprises common hardware resources that are utilized for both uplink and downlink communications.

8. The modem of claim 1,
wherein the modem is a cellular modem configured for use in performing cellular uplink and downlink communications with a cellular base station.

9. The modem of claim 1,
wherein the control manager module is configured to receive a downlink communication in a wireless manner and store received data from the downlink communication in a memory in the downlink manager module for processing by the downlink manager module;
wherein the uplink manager module is configured to receive transmit data intended for uplink transmission and store the transmit data in a memory on the control manager module for uplink transmission to a base station.

10. The modem of claim 1,
wherein the modem is comprised on a single integrated circuit.

11. A wireless device, comprising:
radio frequency (RF) circuitry for performing RF communications; a modem comprising:
  a control manager module comprising a processor core and a control hardware subsystem configured to handle control communications according to a wireless communication technology, wherein the control manager module is coupled to the RF circuitry;
  a downlink manager module comprising a processor core and a downlink hardware subsystem configured to handle downlink data communications according to the wireless communication technology, and wherein the downlink manager module comprises a downlink processor and an associated downlink hardware subsystem coupled to the downlink processor; and
  an uplink manager module comprising a processor core and an uplink hardware subsystem configured to handle uplink data communications according to the wireless communication technology, and wherein the uplink manager module comprises an uplink processor and an associated uplink hardware subsystem coupled to the uplink processor;
wherein the RF circuitry, the control manager module, the downlink manager module, and the uplink manager module are communicatively coupled;
wherein the control manager module is configured to monitor a downlink control channel to obtain scheduling information regarding what downlink or uplink operations are to be performed;
wherein each of the uplink manager module and the downlink manager module is configured to be separately powered down by the control manager module without affecting an ability of the other of the uplink manager module and the downlink manager module to perform its respective tasks, and wherein said powering down is performed based on the scheduling information obtained from the downlink control channel,
wherein powering down the uplink manager module comprises turning off the uplink processor, wherein powering down the downlink manager module comprises turning off the downlink processor,
wherein turning off the uplink processor operates to power down hardware resources in the associated uplink hardware subsystem, and
wherein turning off the downlink processor operates to power down hardware resources in the associated downlink hardware subsystem,
wherein each of the control manager module, the uplink manager module, and the downlink manager module comprises its own configuration software,
wherein the configuration software in each of the control manager module, the uplink manager module, and the downlink manager module independently schedules tasks for its respective module using respective hardware resources in its associated hardware subsystem,
wherein the configuration software in each of the control manager module, the uplink manager module, and the downlink manager module does not comprise hierarchical layers, and
wherein the control manager module is configured to separately power down the uplink manager module and the downlink manager module without conducting global scheduling and global resource management.

12. The wireless device of claim 11,
wherein the control manager module is configured to selectively power on and power off each of the uplink manager module and the downlink manager module based on whether uplink or downlink communications are required;
wherein the control manager module is configured to selectively power off the uplink manager module when uplink communications are not needed;
wherein the control manager module is configured to selectively power off the downlink manager module when downlink communications are not needed.

13. The wireless device of claim 11,
wherein the uplink manager module comprises a first plurality of hardware resources;
wherein the downlink manager module comprises a second plurality of hardware resources;
wherein the first plurality of hardware resources is separate from the second plurality of hardware resources such that no hardware resources are shared between the uplink manager module and the downlink manager module.

14. The wireless device of claim 11,
wherein the control hardware subsystem comprises common hardware resources that are utilized for both uplink and downlink communications.

15. A method, comprising:
by a modem configured for inclusion within a wireless device, the modem comprising:
- a control manager module comprising a control processor and an associated control hardware subsystem coupled to the control processor;
- an uplink manager module configured for use in performing wireless uplink communications, wherein the uplink manager module comprises an uplink processor and an associated uplink hardware subsystem coupled to the uplink processor;
- a downlink manager module configured for use in performing wireless downlink communications, wherein the downlink manager module comprises a downlink processor and an associated downlink hardware subsystem coupled to the downlink processor; and
- a port configured for coupling to radio frequency (RF) communication circuitry;
- wherein the uplink manager module, the downlink manager module, and the port are coupled to the control manager module, the method comprising:
  - monitoring, by the control manager module, a downlink control channel to obtain scheduling information regarding what downlink or uplink operations are to be performed;
  - separately powering down, by the control manager module, at least one of the uplink manager module and the downlink manager module without affecting operation of the other of the uplink manager module and the downlink manager module, wherein said powering down is performed based on the scheduling information obtained from the downlink control channel, and wherein said powering down is performed without conducting global scheduling and global resource management,
  - wherein powering down the uplink manager module comprises turning off the uplink processor, wherein powering down the downlink manager module comprises turning off the downlink processor,
  - wherein turning off the uplink processor operates to power down hardware resources in the associated uplink hardware subsystem,
  - wherein turning off the downlink processor operates to power down hardware resources in the associated downlink hardware subsystem,
  - wherein each of the control manager module, the uplink manager module, and the downlink manager module comprises its own configuration software, wherein the method further comprises, by the configuration software in each of the control manager module, the uplink manager module, and the downlink manager module:
    - independently scheduling tasks for the respective module using respective hardware resources in the respective associated hardware subsystem
  - wherein the configuration software in each of the control manager module, the uplink manager module, and the downlink manager module does not comprise hierarchical layers.

16. The method of claim 15, wherein the control hardware subsystem comprises common hardware resources that are utilized for both uplink and downlink communications.

* * * * *